United States Patent [19]

Corbett

[11] 4,165,210
[45] Aug. 21, 1979

[54] LAMINATED PRODUCTS, AND METHODS AND APPARATUS FOR PRODUCING THE SAME

[75] Inventor: Herbert O. Corbett, Bridgeport, Conn.

[73] Assignee: National Distillers and Chemical Corporation, New York, N.Y.

[21] Appl. No.: 350,220

[22] Filed: Apr. 9, 1964

[51] Int. Cl.² .............................. B29F 3/01; B29F 3/04
[52] U.S. Cl. ................................. 425/133.5; 425/462
[58] Field of Search ............... 425/133.5, 133.1, 131.1, 425/376 A, 380, 462

[56] References Cited

U.S. PATENT DOCUMENTS

| 2,809,393 | 10/1957 | Hauptman | 18/13 P |
|---|---|---|---|
| 3,223,761 | 12/1965 | Raley | 18/13 P X |
| 3,274,646 | 9/1966 | Krystof | 18/13 P X |
| 3,314,108 | 4/1967 | Wienard et al. | 18/14 P |
| 3,354,506 | 11/1967 | Raley | 18/13 P X |

Primary Examiner—Richard B. Lazarus
Attorney, Agent, or Firm—Kenneth D. Tremain

[57] ABSTRACT

Extrusion apparatus for producing laminated products from at least two streams of thermoplastic materials, said apparatus including a flow path leading to a die having a discharge orifice, the thermoplastic materials being introduced separately into the flow path and pass therethrough under pressure in laminar and coextensive streams which flow laminarly and without mixing toward the discharge orifice, without turbulence or friction at the interface between the two streams, and exit therefrom as a laminated film or tube.

6 Claims, 11 Drawing Figures

FIG. 1

LAMINATED PRODUCTS, AND METHODS AND APPARATUS FOR PRODUCING THE SAME

This invention relates to novel apparatus for the production of novel laminated products wherein two or more overlying and coextensive fluid films are formed with laminar flow and, after forming of the laminar streams, are extruded through a common extrusion die orifice, the laminated sheet undergoing a lateral extension with a substantially zero coefficient of friction at the interfaces of the laminated products. By laminar flow is meant the flow of two or more adjacent streams without turbulence so there is no mixing of the materials of the streams. The present invention particularly recognizes that laminarly flowing adjacent streams can undergo a lateral extension without causing normally expected turbulence due to adherence between the stream surfaces.

There is a widespread need for laminated materials, in flat sheets in many varied applications.

By way of example, the seal range of presently used low density high melt index overwrap platic film is relatively critical. In accordance with the invention, one side of the film can have a surface laminated thereon of high density, low melt index film, while the other side of the film can be of relatively stiff material. As another example, two separate streams could be laminated to insure a pinhole-free product. Again, materials of different compositions and different colors could be internally laminated to produce a desired structure or form some desired pattern. Many other novel products which can be formed with the apparatus of the invention will be described hereinafter.

Heretofore, compound extrusions have been accomplished with dissimular and/or pigmented polymers. Such dies are complex in design, and usually contain one or more separate passages to separate adjacent or concentric orifices and the molten polymers are joined, sealed or adhered together, in the area beyond the extrusion die lips.

Other arrangements are known to the art whereby laminated products are formed within an extrusion die. In these arrangements, however, it is not recognized that the product can be laterally extended before or after leaving the die while maintaining the integrity of the laminations.

By lateral extension, is meant the extension of the film in a direction perpendicular to the direction of the flow path. Thus, in a circular extrusion, the diameter of the flow channel within the die may constantly increase to the discharge orifice while still maintaining an integral laminar relationship among the second materials.

For example, U.S. Pat. No. 2,695,422 shows a device where lamination-type techniques are used for coating wire. However, no attempt is made to stretch or extend the laminated films, nor is the possibility recognized. Similarly, U.S. Pat. No. 2,501,690 for making hose fails to recognize the application of lamination techniques to materials which are stretched or extended.

As an important feature of the present invention, a novel die structure is provided wherein similar and dissimilar polymeric elastomers, some of which may be pigmented, are joined prior to discharge from a common extrusion orifice, and are extended laterally and longitudinally after discharge, and while still in a molten condition, to form a laminated film product. By a film product, is meant one whose thickness is less than 10 mils, as contrasted to a sheet product whose thickness is greater than 10 mils. In accordance with the invention, these film products could be as thin as 0.1 mils (0.0001").

More particularly, since all layer thicknesses are independently controllable during and after extrusion of the thermoplastic material, and compatibility of the relative materials comprising each independent film is unaffected, each layer can represent any percentage of the whole film section with any single layer being as thin as 0.000066 inches in thickness. Laminated products of this thickness are not known to have been produced heretofore with methods available to the prior art.

More particularly, the conventional methods wherein preformed finished films are overlayed and joined could not deal with films of such thin and fragile gauge dimensions.

Thus, though it is known that two films can be individually cast and then laminated together either by adhesives, or otherwise, in such a method a certain minimum stiffness, and thus thickness, is required for the handling of the individual films. Since the individual layers of film are not handled separately when using the process of the invention, it now becomes possible to laminate film layers of a thinness previously unusable.

In accordance with the invention, dissimilar, similar and pigmented thermoplastics can be introduced under pressure into the same extrusion die and be made to laminate over, under and inbetween a base extrudate if desired. This also applies for dissimilar polymers, i.e., polyethylene, polypropylene and vinyls and virtually any combinations of extrudable thermoplastic material. Control of this process is every easily accomplished since each different thermoplastic material is supplied from one or more single respective extruders and the various molten streams are joined or associated within a common extruder die by laminar flow within the die.

This might be accomplished through use of two extruders feeding a single die. The lamination will occur no less than ¼" inside the die and a good seal between the two layers is assured. The joined streams then flow laminarly toward the outlet or discharge orifice without mixing.

The die may be constructed with an internal core dividing a first feed channel into two streams. A second feed channel in the core then supplies a central layer for the product to be formed. Control of amount and gauge of the various streams may be obtained by appropriate location and dimensioning of the core. As previously stated, the streams would join somewhere within the die so the lamination is formed under pressure.

A wholly unexpected feature of this invention is that the laminated films have, during extension of the film, very little friction at their interfaces so that the two films, which are coextensive, will extend independently of one another and uniformly, notwithstanding that they may have different mechanical properties.

By way of example, in the case of a flat die arrangement, the laminated stream flows through a relatively small internal die channel, to be discharged by way of an extended orifice, whereby the film must extend laterally over a considerable distance. Because of the unexpected low friction forces between the laminate interfaces, each film was able to extend independently and uniformly without any mixing of the films or interfilm friction. Similarly, in the case of a circular die, the laminates have a constant radial thickness due to the low interfacial friction, and no undue gauge variation was found in the films so produced.

Additional channels may be added to introduce new flow paths so that at least four films can be laminated into a single sheet.

The novel apparatus of the invention has been used for the formation of a great number of plastic film products, many of which are novel in themselves. Examples of these novel products will be provided in detail hereinafter.

Accordingly, a primary object of this invention is to provide a novel apparatus and method for producing laminated thermoplastic materials.

This and other objects of this invention will readily become apparent upon reading the following description of the accompanying drawings, in which:

FIG. 3a shows a bottom view of the novel diverter orifice plate of FIGS. 1 and 2.

FIG. 3b shows a cross-sectional view of the plate body of FIG. 3a.

FIG. 3c shows a top plan view of the diverter orifice of FIG. 3a.

FIG. 3d shows a side plan view of the diverter orifice of FIG. 3c.

FIG. 3e shows a cross-sectional view of FIG. 3c across lines 3e—3e in FIG. 3c.

Figure 1:
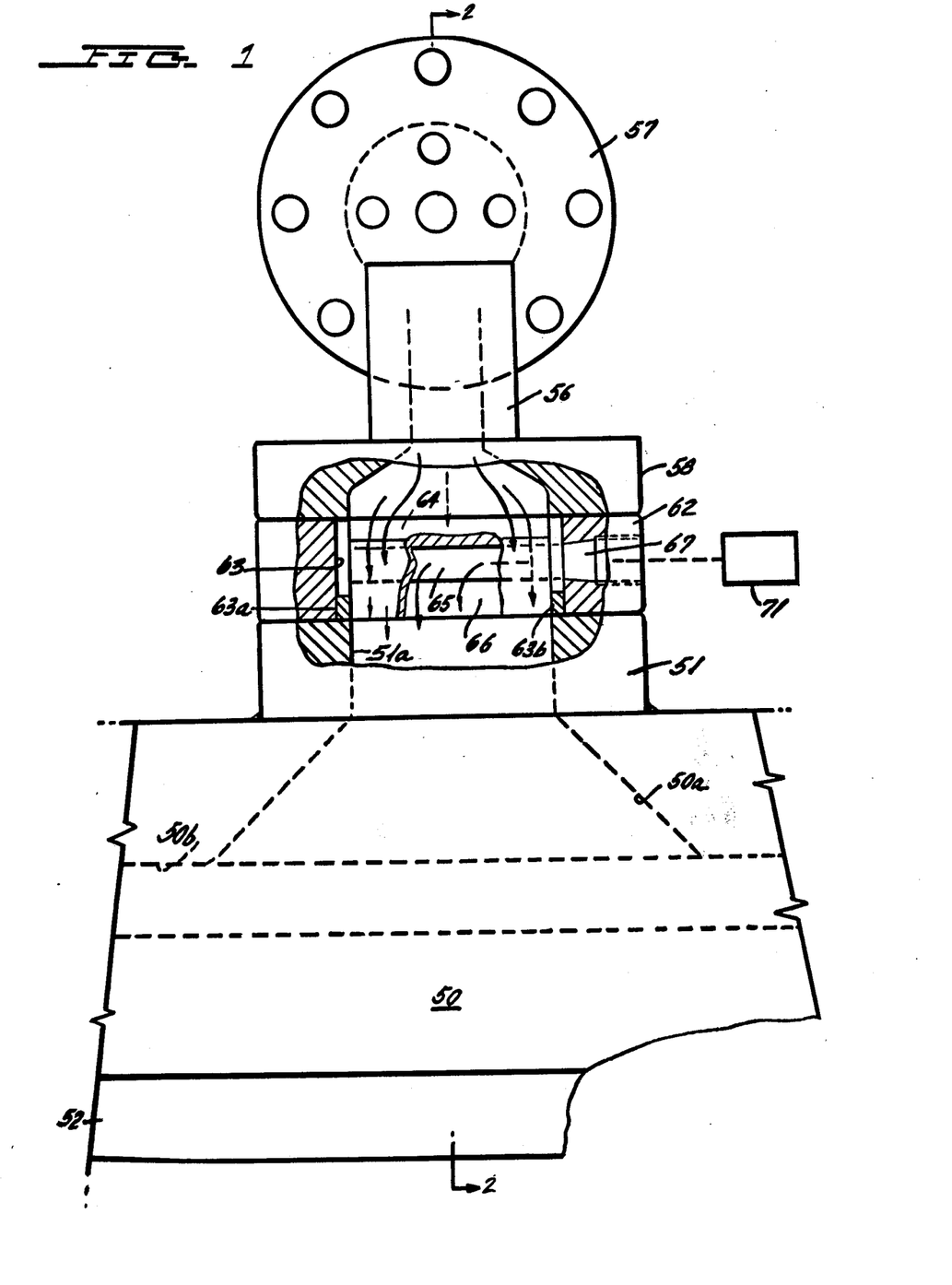
FIG. 1 shows a front elevation view of a novel flat die constructed in accordance with the present invention.
Figure 2:
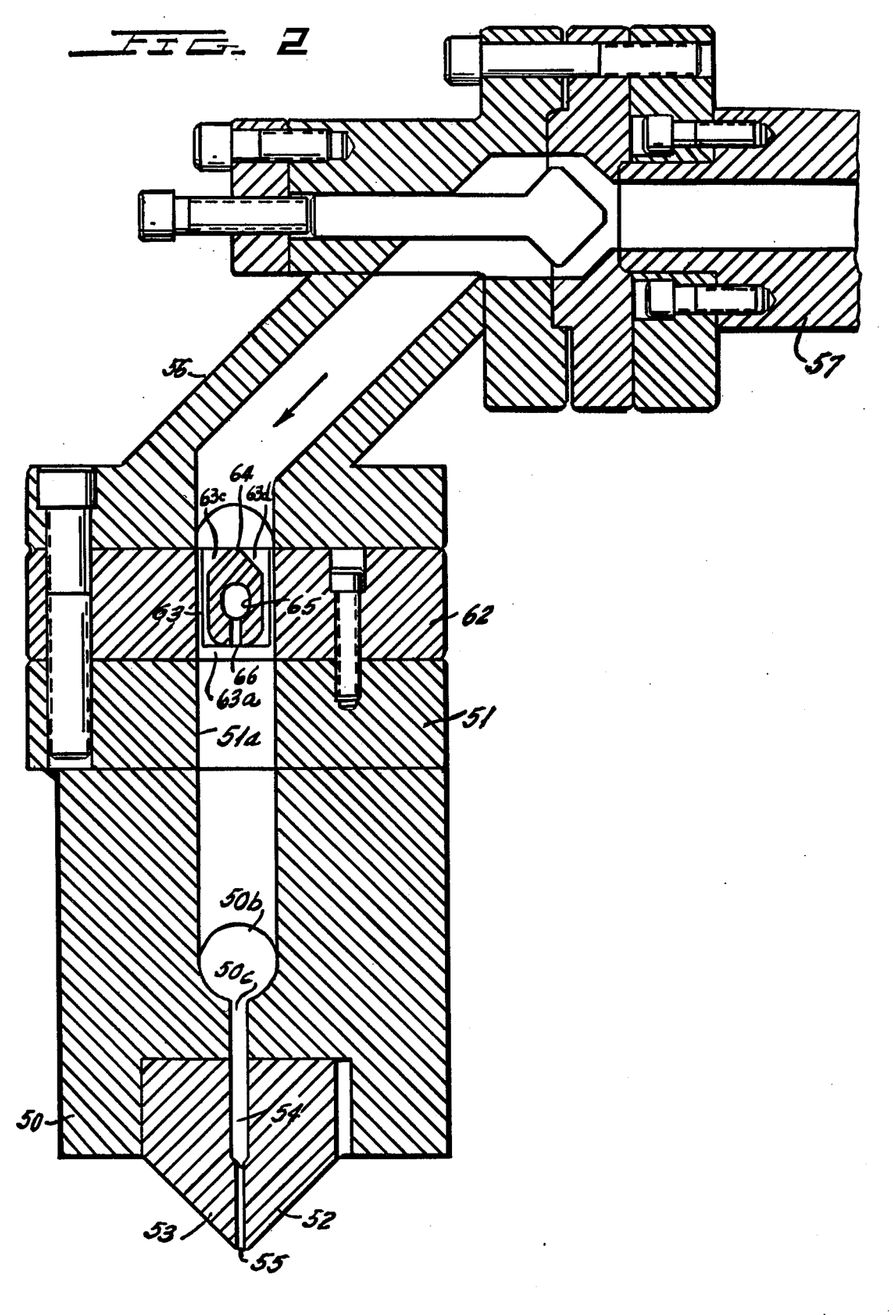
FIG. 2 shows a cross-sectional view of FIG. 1 taken across the lines 2—2 in FIG. 1.
Figure 3:
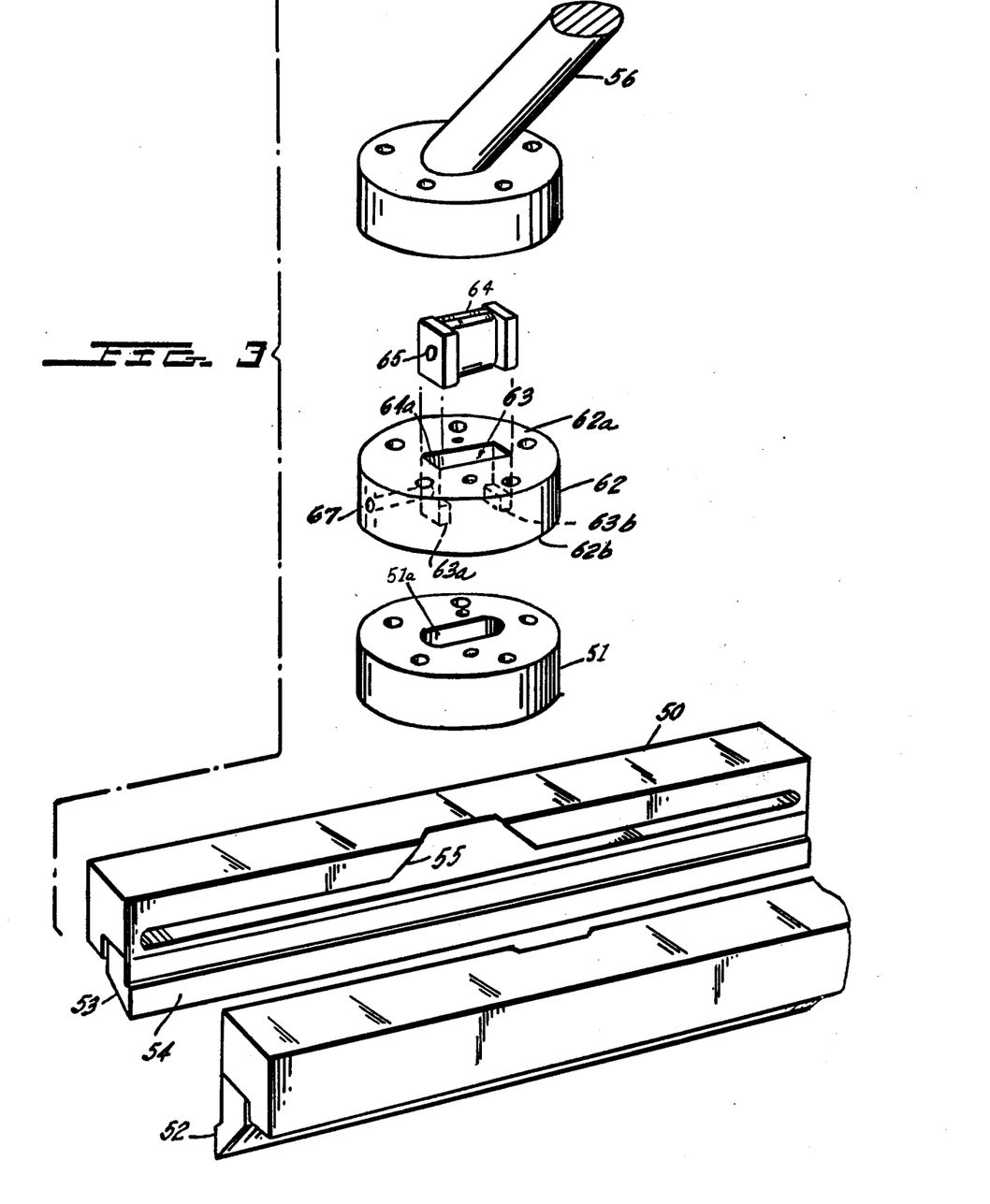
FIG. 3 shows a perspective view of the novel die of FIGS. 1 and 2.
Figures 3A, 3B, 3C, 3D, 3E:
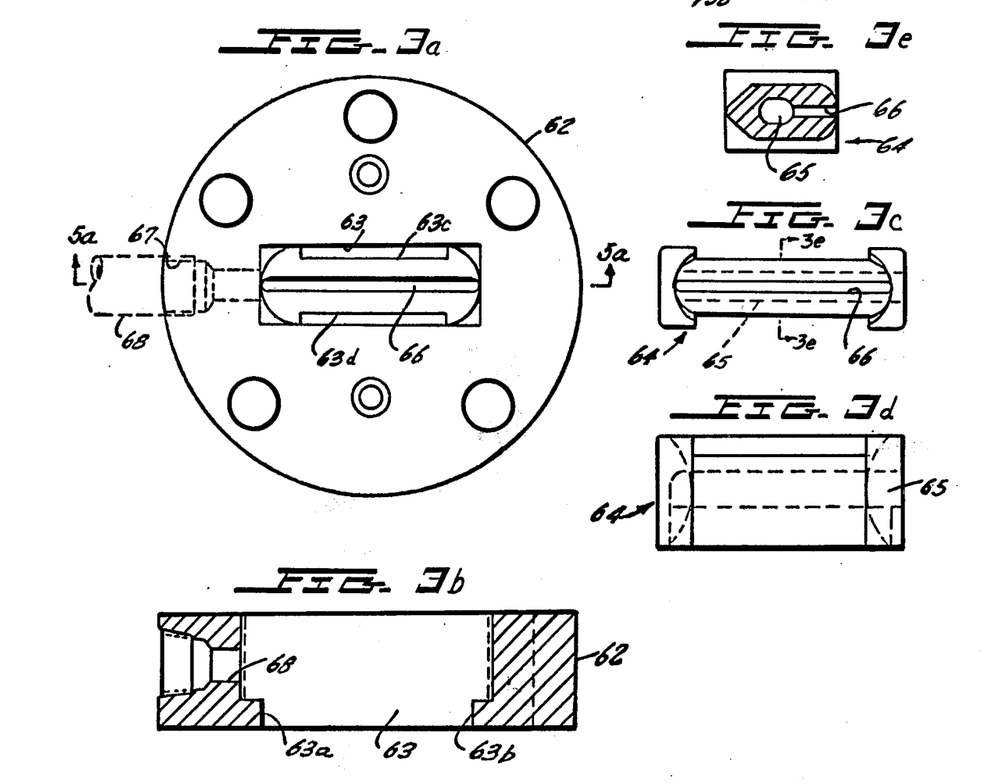

Referring now to the structure as shown in FIGS. 1, 2 and 3, a sheet extruding die is illustrated, including diverter means whereby to accomplish the novel, laminar flow method of extrusion contemplated by the present invention. In this structure, the numeral 50 designates a generally conventional flat die body having a neck portion 51. A passageway 51a is formed in the neck portion, and communicates wtih an angularly extended or divergent passageway 50a in the body 50. The passageway 50a, in turn, opens into a channel 50b extending for substantially the total width of the die, being closed at the outer ends, but having a coextensive radial outlet such as designated by the numeral 50c.

Also, in generally conventional fashion, the die body is adapted to receive a pair of die lips 52 and 53, mounted on the die body 50 in parallel spaced relation to provide an intermediate passageway 54 in communication with the passageway 50c and opening through an orifice 55 for discharge of a sheeted film product. Means, not shown, are conventionally provided for attachment of the lips 52 and 53 to the die body 50, and also for adjustment of the lips to provide for gauge control in the film web discharged from the orifice 55.

In the conventional structure, the neck portion 51 would be bolted directly to an extruder nozzle such as designated by the numeral 56 in FIGS. 1, 2 and 3, the nozzle 56 being secured in turn at the outlet of the extruder barrel 57. In the modified apparatus shown, however, a diverter plate 62 is interposed between the nozzle 56 and neck portion 51.

The diverter plate, as shown, is adapted to provide a matched fit intermediate the nozzle 56 and the neck 51. The plate 62 may be considered as having obverse and reverse surfaces 62a and 62b. The plate itself generally conforms to the shape of the neck 51 and nozzle 56 and is secured thereto as by means of bolts. A shouldered passageway 63, opening through the obverse and reverse surfaces of the plate 62, also is adapted to match at least the passage 51a. The numerals 63a and 63b designate the passageway shoulders.

In the passageway 63 is a diverter element 64. This element is shaped to divide the passageway into two parts providing two flow channels therein which are spaced apart by the body of the element. This element is formed from a solid block having a length and width such as to permit its press fitted insertion into the passageway 63, and a depth such as to permit its engagement against the passageway shoulders 63a and 63b, with the opposite edge portion surface lying in the same plane as the obverse surface 62a of the plate 62. As shown, intermediate the ends of the block, it is machined on both sides in an area substantially corresponding to the distance between the shouldered portions of the plate passageway to produce a channeled portion on each side wherein the surface is adapted to cooperate with the wall of the passageway 63 to form the flow channels 63c and 63d. The outer edge of the block is also machined to provide a wedge-shaped contour which serves to split a stream of molten or plasticized material into two streams which will flow through channels 63c and 63d. Likewise, the inner edge of the block is machined substantially in the manner shown to achieve streamlined flow.

In addition, the block is drilled to provide an internal passageway 65 having an orifice outlet 66 opening radially in parallel relation to the respective surfaces of the channeled portions. The drilled passageway has an inlet disposed so as to coincide with a corresponding passageway 67 drilled through the side edge of the plate 62, and centered on a line parallel to the side walls of passageway 63. The passageway 67 is internally threaded at its outer end to receive a supply conduit 68, adapted for connection to a second extruder such as the extruder 71 of FIG. 1. FIGS. 3a, 3b, 3c, 3d and 3e illustrate the nature and structural features of the diverter plate 62 and element 64 in greater detail.

In operation, and referring particularly to FIGS. 1 and 2, a first thermoplastic material is forced from extruder 57 into nozzle 56. The diverter element 64 in plate 62 causes this material to divide and flow in channels 63c and 63d. At the same time, a second extruder such as schematically illustrated extruder 71 forces a second molten material into channel 65 in diverter element 64 and through discharge orifice 66. Accordingly, the product flowing below diverter 64 will be a laminate of a central material determined by extruder 71 and outer surfaces determined by extruder 57. This flows to the die orifice 55 in a laminar manner so that there is no mixing of the various layers whereby the discharged product will be a laminated film wherein the various layers may have gauge dimensions too thin to be produced by presently known techniques.

Moreover, and as an unexpected feature of the invention, the laminated structure easily spreads throughout the length of the die passageways when the film goes from the narrow width to wide width within the die.

This occurs because of the unexpectedly low or near zero frictional interface between adjacent layers.

It will be noted that additional plies can be introduced by providing additional discharge orifices in the diverter 64, or in the walls forming passageway 51a. Moreover, the relative thicknesses of the various laminae could be varied by using different thicknesses for channels 63c and 63d between the plate 62 and diverter element 64. Moreover, an important feature of the novel structure is that a standard line can be quickly modified for lamination operation by the simple addition of a suitable plate 62.

Figure 4:
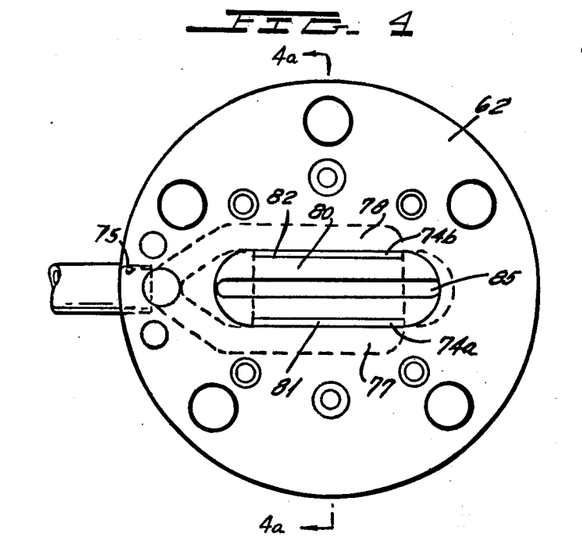
FIG. 4 shows a modified diverter orifice plate wherein the main feed is through the central slot in the diverter orifice.
Figure 4A:
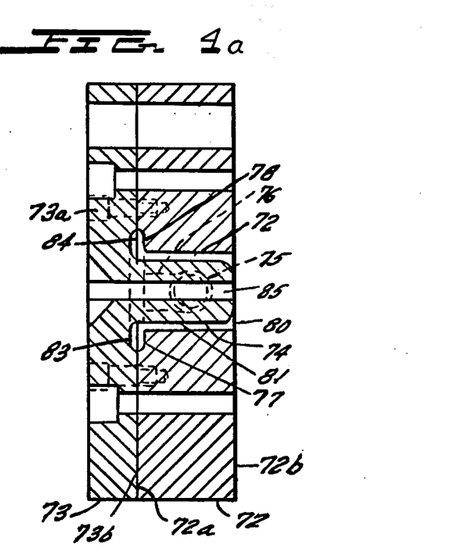
FIG. 4a shows a cross-sectional view of FIG. 4 taken across lines 4a—4a in FIG. 4.

A modified type of diverter plate is illustrated in FIGS. 4 and 4a wherein film is produced with the central lamina being formed from the main extruder 60 of FIGS. 1 and 2, while the coating laminae are produced from the extruder 71 of FIG. 1.

The diverter plate as shown in FIGS. 4 and 4a differs from the plate 62 of FIGS. 1, 2 and 3 in that it is, as shown in FIGS. 4a, formed in two parts, female and male, respectively designated by the numerals 72 and 73. The part 72 is similar to the plate element 62 of the preceding figures and has obverse and reverse surfaces 72a and 72b, and a passageway 74 defined in the plate and opening through said surfaces. This passageway is disposed intermediate the side edges of the plate along a diameter thereof. In effect, this passageway is an elongated slot extending radially from the plate center to an equal distance in each direction therefrom. The ends of the passageway preferably are rounded and machined to provide a mating surface adapted to match with a similar mating surface on male part 73, as leter set forth.

The plate 72 is drilled to provide a bore 75 extended through the edge of the plate intermediate the obverse and reverse surfaces and on a line parallel with the side walls of passageway. The bore 75 stops short of one end of the passageway 74. A bore 76 is also drilled through the obverse surface on a center line intersecting the center line of the bore 75, to open into the latter.

The obverse surface is routed to form bifurcate grooved portions 77 and 78 starting from the opening of bore 76 and extending into parallel open sided relation to the passageway 74 intermediate the ends thereof. Similar and matching grooves are formed in the male part 73, as later described.

The male part 73 is of substantially the same dimension and conformation as the part 72, and has obverse and reverse surfaces 73a and 73b. On the reverse surface of this part 73 is an elongated boss 80 originally having the exact conformation of the passageway 74, the end parts being rounded and polished for mating relationship with the end parts of the passageway or slot 74. The side walls of the boss, however are routed and machined to provide wide flat groove portions 81 and 82. The bottom faces of the respective grooves, when disposed, as particularly shown in FIG. 4, in opposition to the side walls of the passageway 74 cooperate therewith to define a pair of channels 74a and 74b.

The reverse surface of the plate part 73 is also routed to form grooves 83 and 84 adapted for matched relation to the grooves 77 and 78. These grooves 83 and 84 at the base of the boss 80, are formed to open laterally into the grooves 81 and 82 in the boss. A slotted portion 85 is formed in the boss to open therethrough from the obverse surface of the plate part 80. This portion 85 parallels the grooves 81 and 82, and is substantially coextensive therewith for the length of the groove portions 81 and 82.

In use, the plate parts 73 and 72 are assembled by insertion of the boss 80 into the passageway or slot 74, with the groove portions 83 and 84 matched to the grooves 77 and 78 respectively, whereby they cooperate to form a bifurcate passageway communicating with the bore 76. The two plate parts may then be bolted together to form a united assembly.

This assembly may be employed in substitution for the plate 62 of FIGS. 1 to 3 inclusive. As will be evident, when so employed, the feed from the extruder 57 will be delivered through the longitudinal slot 85 in the boss 80, while the feed from the extruder 71 will be delivered by way of the bores 75 and 76 and the bifurcate passageway to the channels 74a and 74b. Thus, whereas when using the plate 62 and its diverter element 64, the feed from extruder 57 is divided to coat both sides by the stream supplied from extruder 71, when using the plate assembly of FIGS. 6 and 6a, the coating action is reversed, the feed from extruder 57 being coated on both sides by the stream supplied by extruder 71.

As previously indicated, it is sometimes desirable to laminate at least one stripe into the body of the material being extruded. It is apparent that in the embodiment of FIGS. 1, 2 and 3, this type of striping can be achieved by simply constricting the width of the discharge orifice 66 in the adaptor member, whereby the flow of the striping material is reduced to an amount less than required to coat the entire surface of the flow streams through channels 63a and 63b.

An illustrative list of products capable of at least semi-solid fluid flow which could be laminated in various combinations follows. Note that this list is representative only and is not to be considered as limiting combinations selected therefrom.

Acetal
Methyl Methacrylate
Ethyl Cellulose
Cellulose Acetate
Cellulose Acetate Butyrate
Cellulose Nitrate
Nylon
Polyethylene, High, Medium and Low Densities
Polypropylene
Co-polymerized Polyolefins
Polyallomer
Polycarbonate
Poly I Butene
Polychlorotrifluoroethylene
Polytetrafluoroethylene
Fluorocarbon
Polystyrene
Styrene Acrylonitrile Copolymer
Acrylonitrile Butadiene Styrene Terpolymers
Vinyl Acetate
Vinyl Alcohol
Vinyl Butyral
Vinyl Chloride Rigid
Vinyl Chloride Acetate
Vinyl Chloride Elastomeric Compounds
Rubber Extrusion Compounds
Chlorinated Rubber
Hard Rubber
Silicone Rubber and Compounds
All extrudable thermosetting compounds such as Mylar, Phenolics & Epoxies
Cellophane and Paper Pulp Compounds
Non-Ferrous metals such as Brass, and Aluminum

EXAMPLE 1

As a first example of a film of unusual characteristics which can be formed by the novel process and apparatus of FIGS. 1-4, a novel wrap film can be formed which has an extremely wide seal range. It is known that wrap film must have at least a minimum stiffness (known to the industry as "handle"). Handle is that quality whereby the film will not droop or tend to bunch up. However, the film should be capable of being sealed to itself by heat. To this end, wrap film has been formed of a main layer of polypropylene which provides the requisite stiffness. A layer of polyethylene is then laminated to the polypropylene to permit heat sealing between the overwrapped polyethylene surfaces. To create a good heat seal, the sealing temperature must be very accurately controlled. If the temperature were too low, the polyethylene layer would not soften properly for sealing. If the temperature were too high, the polyethylene layer would be destroyed. In presently used film wrap, this permissible sealing range is only from about 240° F. to 255° F. or about 15° F. In accordance with the present invention, a novel wrap is formed which has a seal range which is extended to the range from 240° F. to 320° F., or 80° F. This permits greater latitude in the design and operation of sealing equipment and also reduces the number of rejects in any given operation.

More specifically, and as shown in FIG. 9, apparatus of the type shown in FIGS. 1-8 can easily extrude laminated film 200 having a central polypropylene layer 201 and outer polyethylene layers 202 and 203. The total thickness of the film is preferably of the order of 1±0.05 mil with the polypropylene layer 201 occupying 20% of the total thickness, while the polyethylene layers 202 and 203 each occupy 40% of the total thickness. More generally, the center layer 201 can occupy from 5 % to 30% of total thickness while the outer layers 202 and 203 can each occupy from 45% to 35% of total thickness.

While it may be possible to fabricate the novel film of FIG. 9 by other techniques, note that the central film 201 may have a thickness of the order of 0.000066". It would be extremely difficult to handle such thin films in presently known processes for film lamination.

The film of FIG. 9, as indicated above, has been formed to have the requisite stiffness of a wrap film because of the strong polypropylene central layer. The outer polypropylene layers have an increased thickness and therefore an increased thermal inertia. It is believed for this reason that the seal range has been increased to 80° F. (in the order of 400%) when compared to the seal range of presently used wrap film of the same total thickness.

EXAMPLE 2

It has previously not been possible to provide film which is colored to a metallic hue. In accordance with the invention, however, it has been found that when the central layer is of a dyed material and the outer layers are of transparent materials, that the overall film will take on a metallic hue dependent upon the color of the central layer. By way of example, in the embodiment of FIG. 9, the central polypropylene layer 201 can be colored yellow by the mixture of cadmium yellow in the polypropylene melt. When this layer is coated by transparent layers 202 and 203 of polyethylene, the film will take on a metallic gold appearance.

Other similar metallic hues can be imparted to the film by suitably coloring the middle layer of the film.

In a similar manner, a green pigment has been introduced into the central layer with aluminum flakes to impart a green color after coating with a transparent coat.

Clearly, any combination of particular materials could be used other than the polypropylene and polyethylene when obtaining the metallic hue effect.

Note that the film layers can be of any desired relative thickness for this result and that the thickness ratios are not limited to those given in Example 1.

Figure 5:
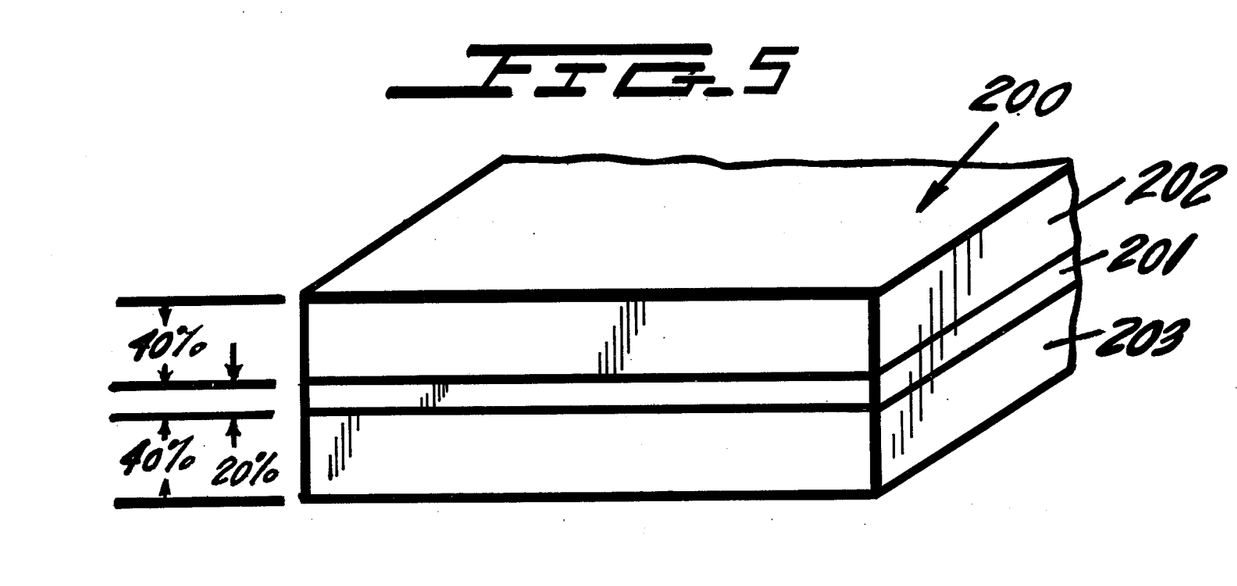
FIG. 5 shows a novel laminated film produced in accordance with the invention.

Moreover, the central layer can be formed as a central colored stripe covered by upper and lower transparent films by use of the apparatus of FIG. 8 or by modifying the apparatus of FIGS. 3, 4 and 5, to inject only a thin stripe from the channel 69.

Thus, some desired pattern of metallic stripes or sections can be formed in the film.

I claim:

1. An apparatus for extruding laminated plastic products comprising an extrusion die defining a first passageway for fluid materials, said first passageway having a narrow, elongated discharge orifice, a first extruder, a second extruder, a first conduit having one end connected to said first extruder, a second conduit having one end connected to said second extruder, a flow dividing means comprising a solid diverter and two spaced channels, said diverter extending completely across said first passageway and having an internal passageway extending longitudinally therethrough, said channels each communicating at one end with said first passageway and at the other end with said first conduit, said diverter being positioned so as to direct fluid material from said first conduit into said channels, said internal passageway within said diverter communicating at one end with said second conduit and at its other end with a second longitudinal orifice situated intermediate and parallel to said channels, said second longitudinal orifice communicating with said first passageway at a point remote from said discharge orifice whereby fluid material from said first conduit is divided into two streams which are laminarly joined within said first passageway to either side of a central stream of fluid from said second elongated orifice, said first passageway merging into an intermediate portion of reduced width which communicates directly with the elongated discharge orifice whereby the laminated materials being extruded through said first passageway will be laminarly reduced in thickness and extended longitudinally prior to entering into said elongated discharge orifice.

2. The apparatus of claim 1 wherein said first passageway diverges laterally toward said elongated discharge orifice whereby the materials in said first passageway are laterally extended prior to exiting from said discharge orifice.

3. The apparatus of claim 2 wherein the discharge orifice is substantially more elongated than the second orifice.

4. The apparatus of claim 1 wherein the flow dividing means comprises a plate having an opening there through and the diverter positioned within said opening with two opposite sides of said diverter spaced from and cooperating with opposing inner walls of said opening to form the spaced channels.

5. The apparatus of claim 2 wherein the discharge orifice is defined by die lips which are less than 10 mils apart.

6. The apparatus of claim 4 wherein the plate is removably connected to the extrusion die with the opening in communication with the first passageway in said die.

* * * * *

UNITED STATES PATENT AND TRADEMARK OFFICE
CERTIFICATE OF CORRECTION

PATENT NO. : 4,165,210
DATED : August 21, 1979
INVENTOR(S) : Herbert O. Corbett

It is certified that error appears in the above—identified patent and that said Letters Patent are hereby corrected as shown below:

On the title page, first column:

"Filed: Apr. 9, 1964" should be

--Filed: March 9, 1964--.

Signed and Sealed this

Twelfth Day of January 1982

[SEAL]

Attest:

GERALD J. MOSSINGHOFF

*Attesting Officer*     *Commissioner of Patents and Trademarks*